United States Patent

Nickoladze

[11] 4,229,689
[45] Oct. 21, 1980

[54] AC SYNCHRONIZED GENERATOR

[76] Inventor: Leo G. Nickoladze, 91969 Kalapu St., Ewa Beach, Hi. 96706

[21] Appl. No.: 88,161

[22] Filed: Nov. 5, 1979

[51] Int. Cl.³ .......................... H02P 9/42; H02P 9/48
[52] U.S. Cl. ...................................... 322/32; 310/112
[58] Field of Search ...................... 322/32, 35, 14, 29, 322/47; 310/112, 113

[56] References Cited

U.S. PATENT DOCUMENTS

| 2,147,381 | 2/1939 | List et al. | |
| 2,497,141 | 2/1950 | Schultz | |
| 2,903,641 | 9/1959 | Roe | 322/32 X |
| 3,183,431 | 5/1965 | Ford | 322/32 |
| 3,200,324 | 8/1965 | Wagner | 322/32 |
| 3,644,766 | 2/1972 | Hughes | |
| 3,743,873 | 7/1973 | de Jong | |
| 3,770,999 | 11/1973 | Kovalkov et al. | |
| 4,074,160 | 2/1978 | Broadway | |
| 4,109,170 | 8/1978 | Fujita et al. | |
| 4,134,054 | 1/1979 | Akamatsu | |
| 4,155,019 | 5/1979 | Weghaupt | |
| 4,168,459 | 9/1979 | Roesel, Jr. | |

Primary Examiner—Robert J. Hickey
Attorney, Agent, or Firm—William C. Babcock

[57] ABSTRACT

An AC synchronized generator includes an exciter stage and a generating stage, the exciter stage comprising an exciter stator connected for excitation to any conventional AC source and an exciter rotor driven in rotation therein by any convenient source of rotary power. The exciter rotor is mounted for common rotation with a generator rotor, the windings of the exciter rotor being connected in subtraction, or in an inverted connection with those of the generator rotor. A generator stator is then used to produce the current to a load. In this form the rotating magnetic field of the exciter stator will be added to the angular rate of the exciter rotor, which is therefor induced at an AC rate corresponding to the sum of these two angular rates. The generator rotor, being electrically connected in opposite direction but driven along with the exciter rotor, will carry a magnetic field which travels as the difference between the magnetic field in the exciter rotor and the rotor angular rate. The net difference that will appear at the generator stator will be equal to the rate of the AC source. Thus the load will see a generated current at the frequency of the AC source.

1 Claim, 4 Drawing Figures

AC SYNCHRONIZED GENERATOR

BACKGROUND OF THE INVENTION

1. Field of the Invention

The present invention relates to electric generators, and more particularly to generators referenced to an alternating current source.

2. Description of the Prior Art

With the recent shortages in electrical power produced by public utilities, various independent power augmentation techniques have appeared in the marketplace. Most frequently, such augmentation techniques take the form of either solar or wave action powered generators, or generators powered by fans driven by wind. In each instance generators or the foregoing type vary in the frequency rate according to the rate of the wind or the solar or wave activity. Thus, when applied as an augmenting power source elaborate techniques are necessary to match the frequency generated locally with that generated by the public utility. It is this problem of synchronizing a local generator with the frequency carried on the power lines that has been the subject of most extensive controversy. Tying such generators to the public grid often had the undesirable effect of modifying the grid waveform and in most such prior art applications the typical expedient used was to completely switch out the grid when the local generator was to be used. This radical solution leaves the user very little option since partial augmentation of the grid power cannot be achieved. Thus the user either pays for the costs of the power delivered from the public utility or must suffer the vagaries of nature in the form of constantly changing solar power, wind power, or wave power.

It is therefore both necessary and desired to provide an inexpensive generating device which by virtue of its structure is synchronized with the grid frequency.

SUMMARY OF THE INVENTION

Accordingly, it is the general purpose and object of the present invention to provide an auxiliary generator which may be conveniently synchronized with the AC frequency provided by a public utility.

Other objects of the invention are to provide an auxiliary generator which may augment the power delivered by a public utility according to the power levels locally realized.

Yet additional objects of the invention are to provide an AC synchronized generator which may be driven at any angular rate.

Yet additional objects of the invention are to provide an AC synchronized generator which is both easy to produce and convenient in use.

Briefly these and other objects are accomplished within the present invention by conforming a generator to include two stages, the first being referred to herein as the exciter stage and the second as the generating stage. The exciter stage may be conformed in a manner typical of any three phase multi pole motor, comprising an exciter stator connected for excitation to a source of 60-cycle alternating power and an exciter rotor driven in rotation by any locally produced power source within this exciter stator. The second stage of this generator assembly includes a generator rotor, connected for common rotation with the exciter rotor, having a winding connected to the exciter rotor but of opposite rotation. To compensate for the angular difference between the excitation potential and the generator output vector the windings of the generator rotor may be angularly displaced. This angularly displaced generator rotor is placed to turn inside a generating stator set of poles which are thus excited by the magnetic vector of the rotor. It is this generator stator that is then connected to a load. By virtue of the opposed winding in the exciter rotor and the generator rotor the magnetic vector induced in the exciter rotor winding is equal to the angular rate thereof plus the AC rate of the public grid. The magnetic vector in the generator rotor as seen by the generator stator then has the effect of subtracting out the locally generated angular rate. Thus the magnetic vector in the generator rotor is exactly at the cycle rate delivered by the the public grid. The generator stator field may be tapped and compared in phase with the 60-cycle public grid signal to produce a phase error signal to a servo motor. It is this servo motor that is used to drive the exciter stator to optimize the phase difference. In this manner the load is driven by a signal which is exactly 60-cycles at an optimum phase with the 60-cycle public grid signal allowing for convenient augmentation.

DESCRIPTION OF THE SPECIFIC EMBODIMENT

Figure 1:
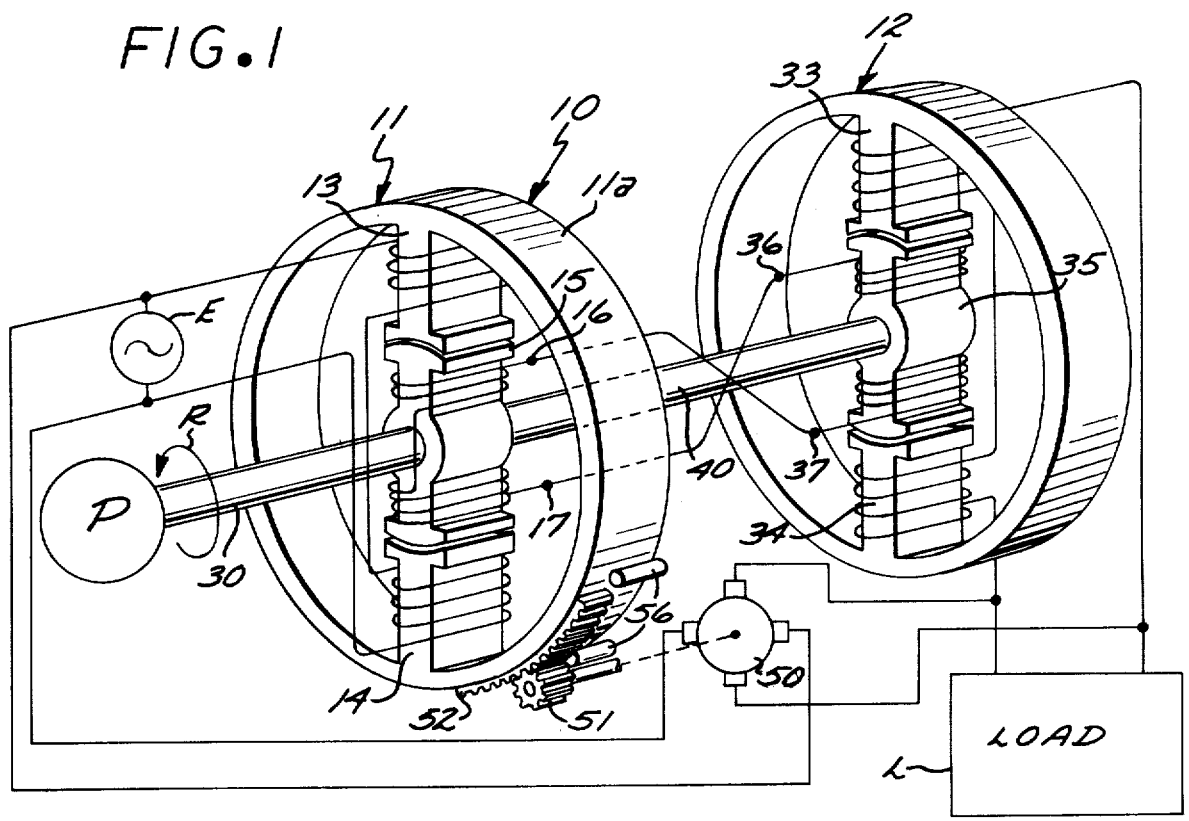
FIG. 1 is a simplified diagrammatic illustration of an AC synchronized generator constructed according to the invention herein.
Figure 3:
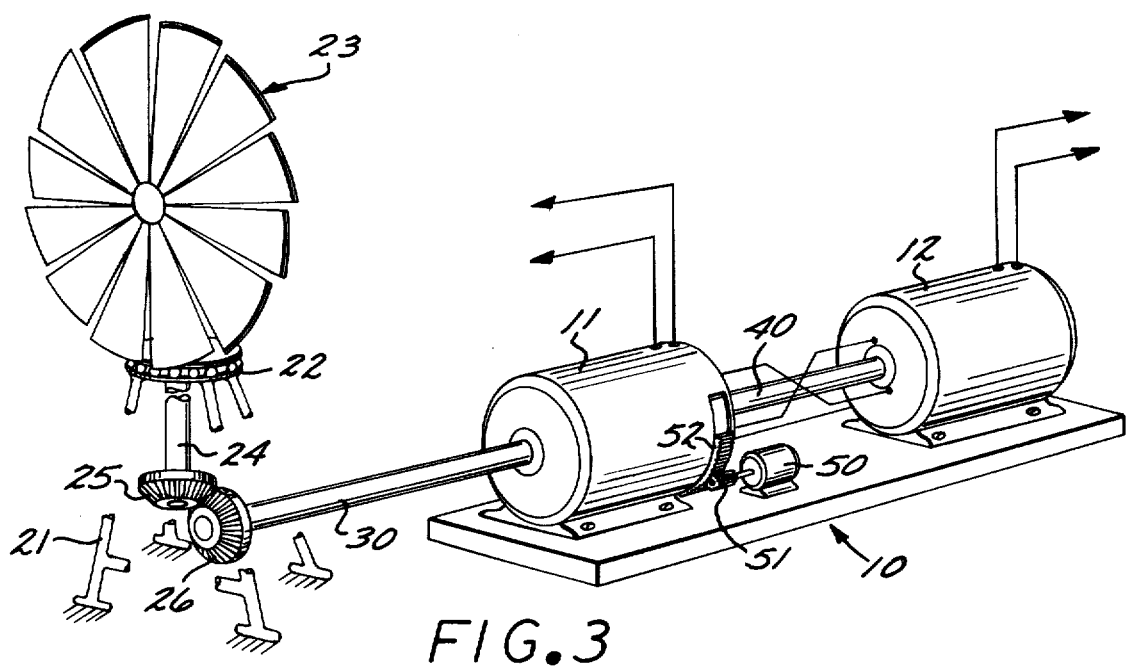
FIG. 3 is a perspective illustration of the AC synchronized generator set out herein.

As shown in FIGS. 1 and 3, the inventive AC synchronous generator, designated by the numeral 10, comprises an exciter stage 11 and a generating stage 12 both connected for rotary input to a source of rotary power P. Such a source of rotary power P may be any one of the many environmentally safe power sources, the particular one used as an example herein being that of a windmill. More specifically, the power source P as shown herein, comprises a windmill stand assembly 21 provided with a roller platform 22 at the upper end thereof on which a propeller assembly 23 is deployed. The shaft 24 from the propeller assembly 23 is directed downwardly through the support assembly 21 where it terminates in a conical gear 25 meshed with yet another conical gear 26 for providing a horizontal shaft outlet. Alternatively (not shown) the synchronous generator 10 may be directly tied to propeller 23. The propeller shaft, illustrated herein by way of a shaft 30, shall therefore rotate at a rate corresponding to the rate developed at the propeller assembly 23. For convenience herein, the foregoing rate shall be denominated as rate R. This rate R is typically a balance between the torque reflected into shaft 30 from the generator 10 and the power developed at the propeller assembly 23. Thus, depending on the wind conditions and the load on the generator 10 a constantly varying angular rate R exists which heretofore required extensive hardware to convert the frequency thereof to the cycle rate normally impressed on any public utility electrical line.

It is to be understood that the foregoing example of a windmill exhibits the same characteristics as any other locally generated power source and the power generated for example by a solar collector or wave action will similarly exhibit a varying angular rate depending on the balance between the demand and the instantaneous output of the collection system. Thus inherent in all naturally powered systems is a frequency variation which heretofore entailed elaborate hardware techniques in order to match the frequency band pass of the appliances now in the marketplace.

To accommodate this frequency mismatch the generator 10 includes the foregoing exciter stage 11 comprising a stator assembly 11 arranged to include two field poles 13 and 14 series wound across a source of electrical excitation E. It is this source of electrical excitation E that is tied directly to the utility lines and will therefore have the normally existing electrical frequency imposed thereon. Arranged for rotation between poles 13 and 14 is an exciter rotor 15 connected to shaft 30. Thus the magnetic field impressed onto rotor 15 is a field comprising the summation of the electrical phase of the source E and the angular rate R of the shaft. The exciter rotor 15 may be conventionally wound and thus will include output terminals 16 and 17 on which the induced signal appears. It is to be understood that it is this induced signal that conforms to the summation of the magnetic vectors developed as result of the cycling of the source E and the rotation R of the shaft 30.

The shaft 30, through rotor 15, extends in the form of a shaft segment 40 to yet another rotor assembly 35. Rotor assembly 35 is aligned for rotation within the generating stage 12, which similarly to the exciter stage 11 includes two field poles 33 and 34. Field poles 33 and 34, similar to the stator poles 13 and 14, are again series wound across a load L.

In order to provide a generated output which is exactly equal in frequency to the frequency of the source E the rotor assembly 35 is wound in the opposite direction to the rotor 15. Thus, as shown in FIG. 1, terminals 16 and 17 are connected in inverse to terminals 36 and 37 which are deployed across the winding of rotor 35. The result achieved is as follows: As the exciter rotor 15 rotates within the magnetic field developed by signal E the induced signal frequency across terminals 16 and 17 is equal to the summation of the magnetic vectors developed at the poles 13 and 14 and the angular rate R. As rotor 35 rotates within the generating stage 12 the inverse connection to that rotor results in a magnetic field vector rotation which is exactly equal to the cycle frequency of the source E. More specifically, the inversion across terminals 16 and 17 and terminals 36 and 37 now subtract out that portion rate R of the magnetic vector rate. The load therefore will be driven by a signal frequency exactly equal in rate to the frequency of the source E. Furthermore, to match the phase angle of the generator output to the source E, the angular position of poles in the rotor assembly 35 may be advanced or retarded in relation to the poles in the rotor 15, depending on the ratio of inductance and resistance of the pole windings, thus matching the output with source E.

The foregoing signal frequency may be further matched by way of a servo arrangement which is utilized to shift the exciter stator in angle relative the generator stator so that loading of the generator can occur. More specifically, shown herein is a servo motor 50 connected to be driven by the difference between the signal E and the signal across the load L and mounted to rotate a pinion gear 51. Pinion gear 51 may be aligned to mesh with a rack segment 52 on the periphery of the exciter stator 11a which is supported for angular motion on rollers 56. The stator will thus be driven to correct the phase difference between the source E and the load L. Accordingly, a fully matched phase and frequency output can be provided which, if controlled in amplitude swings, may be directly superposed onto the utility lines.

Figure 2:
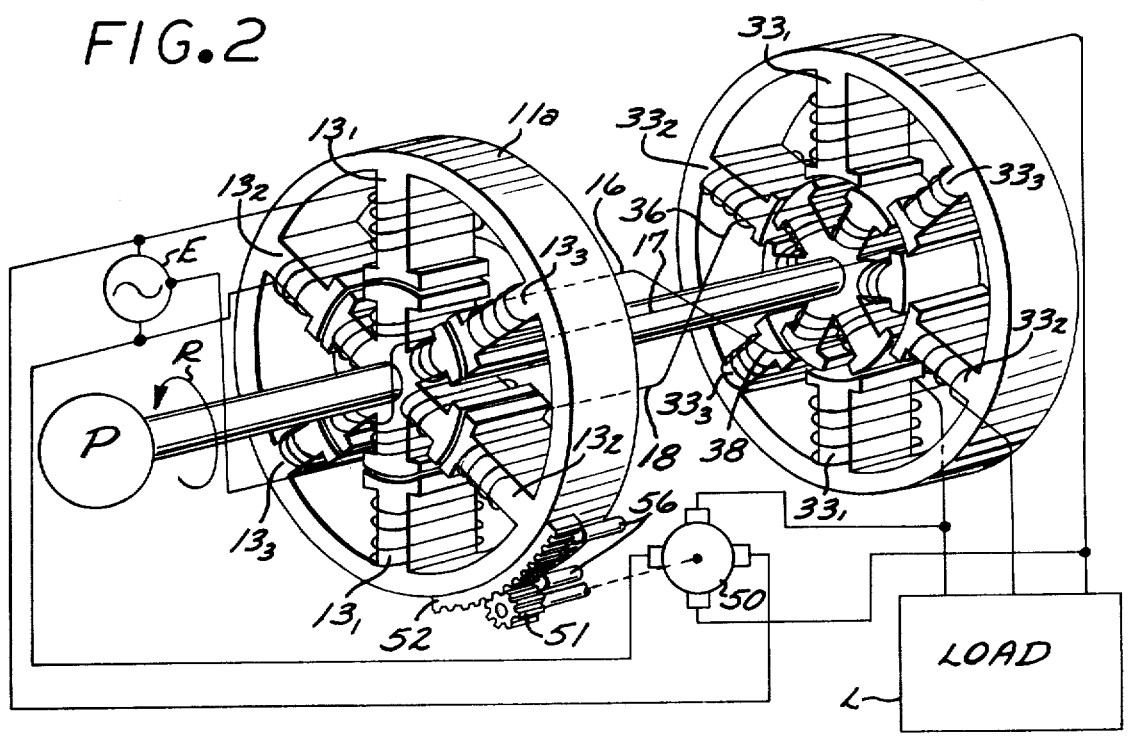
FIG. 2 is yet another diagrammatic illustration of the AC synchronized generator set out herein expanded to the number of phases commonly delivered to a household.

It is to be noted that the foregoing description, in the interests of clarity, has been drawn to a single phase stator arrangement. In practice, both single and multiphase power sources can be accommodated by selective pole winding and connection. Thus to improve the fidelity of the magnetic vector progressions within the exciter stage it is possible to provide additional field and rotor windings, as shown in FIG. 2. More specifically, as shown in this figure, the exciter stage 11 includes pole pieces denominated by the subscript 1, 2 and 3 as pole pieces $13_1$, $13_2$ and $13_3$ corresponding to three phases. Similarly the stator of the generating stage includes pole pieces $33_1$, $33_2$ and $33_3$. For example, a sequence of pole pieces $13_1$, $13_2$ and $13_3$ may be selected to create a magnetic field rotating in the stator and about the rotor in the opposite direction to the direction of the angular rate R. In this manner the frequency induced in the rotor 15 of the exciter stage will be the sum of frequency E plus the angular rate R. Since the leads of the rotor windings 16, 17 and 18 are reversed connecting lead 16 of the exciter stage to terminal 38 of the generator stage lead 18 of the exciter to terminal 36 of the generator stage the velocity of the magnetic vector in the rotor of the generator in relation to the rotor will be the $E+R$ but of opposite direction in relation to the exciter rotor. However, both rotors are mounted on the same shaft. The magnetic vector frequency in relation to the generator stator will therefore be $E+R-R=E$ or the frequency rate of E.

Again, to match phase angles of the generator output and the source E, position of the exciter rotor poles may be angularly advanced or retarded in relation to the generator rotor poles. FIGS. 1 and 2, for simplicity, illustrate salient poles. The foregoing is applicable to non-salient poles as well.

The connection may be either a wye or other form of connection, there being in the conventional form three connection terminals across the source E.

Figure 4:
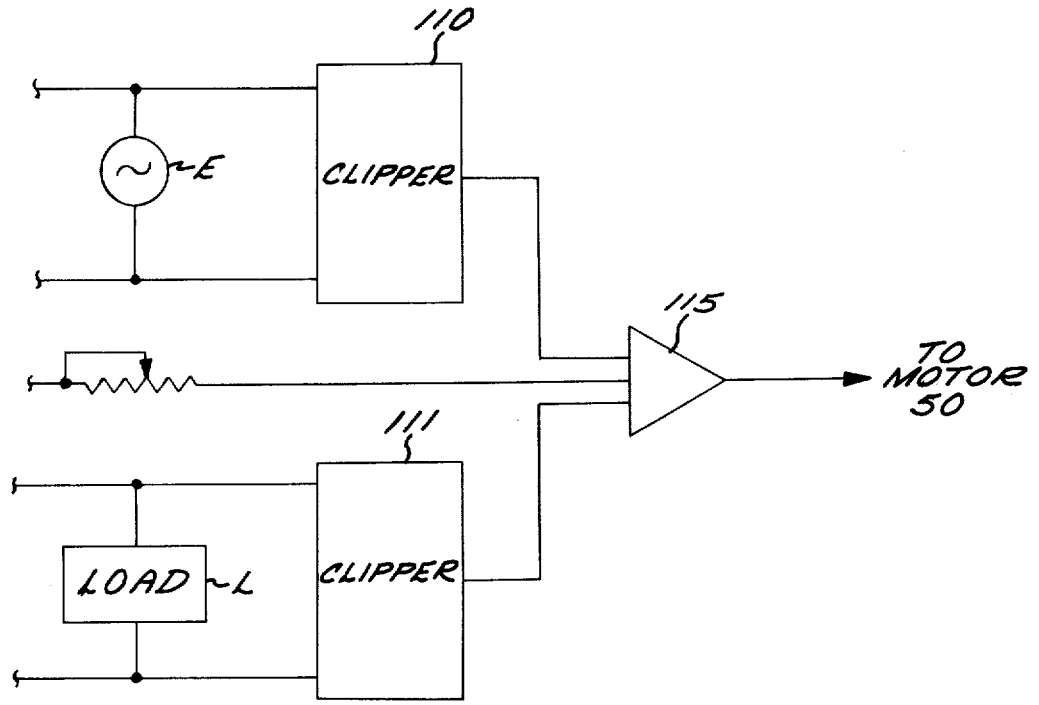
FIG. 4 is a servo arrangement for correcting the phase angle of the generator herein.

As shown in FIG. 4 the comparison between the input and the output may be simply achieved. More specifically, shown connected across the signal E is a clipper circuit 110 with a similar clipper circuit 111 across the load L. Clipper circuits 110 and 111, in a conventional manner, square up the sinesoidal weight form across E and across L and limited to a defined amplitude. The outputs of clipper circuit 110 and 111 are then summed at a differential amplifier 115 with a control signal C which thus will produce an output equal to the desired phase between the two clipped signals. This output, in pulsed form, is then filtered and connected to drive the servo motor 50 in a direction which will cancel the phase difference. Thus, optimum loading angles may be set in for maximum efficiency. That same servo loop may be utilized to match the vector angles at stall condition, to reduce the loading to that of a line transformer.

By virtue of the foregoing arrangement of parts a generator assembly is achieved which, without major structural arrangement, produces a signal output equal in frequency to the signal frequency normally found on utility lines. The result achieved provides the user with a clean 60-cycle generated output regardless of the speed of the windmill or any other power source. Any back EMF or torque reflection are taken directly through the shaft segment 40 into the shaft 30 and will therefore modify the input rate rather than any other function. Since the input rate is effectively nulled out this generator assembly 10 may be driven to full output or maximum current, the only limitation being the torque levels developed by the power source P. In addition, the structure shown herein lends itself to convenient wave form compensation. Specifically, the geometry of the pole pieces may be modified or the exciter stator wave form may be shaped to produce clean sine wave output at the generator stage.

Obviously many modifications and changes may be made to the foregoing description without departing from the spirit of the invention. It is therefore intended that the scope of the invention be determined solely on the claims appended hereto.

What is claimed is:

1. A generator referenced to the frequency of the alternating current of a public utility comprising:

an annular exciter stator including a plurality of exciter electromagnetic poles connected for excitation by said alternating current for producing a first magnetic vector therebetween at an angle rate corresponding to the frequency of said alternating current, said exciter stator including a rotary mounting for the angular alignment thereof and an arcuate rack formed on the exterior;

an exciter rotor mounted for rotation on the interior of said exciter stator, said exciter rotor including a plurality of electromagnet exciter inductors conformed for inductive coupling with said exciter poles for producing an excited current thereon of a phase and frequency corresponding to the summation of said angular rate of said first magnetic vector and the rotational rate of said exciter rotor;

a generating rotor connected for common rotation with said exciter rotor, said generating rotor including a plurality of electromagnetic generating inductors corresponding to said exciter inductors and connected in opposite alignment therewith, said generating inductors being displaced in angle relative said exciter inductors whereby a second magnetic vector of opposite angular rate to that of said exciting current is produced by said generating inductors;

an angular generating stator mounted in surrounding relationship around said generating rotor, said generating stator including a plurality of electromagnetic generating poles aligned for electromagnetic induction by the advance of said magnetic vector on the interior thereof;

power means connected for angular advancement of said exciter and generating rotor;

a servo motor connected for engagement with said rack for angular advancement of said stator; and, phase comparing means connected to said alternating current, and the signal induced on said generating poles for advancing said servo motor in rotation according to the phase difference therebetween.

* * * * *